Feb. 8, 1944. J. C. GARAND 2,340,874
MACHINE TOOL FEEDING MECHANISM
Filed March 20, 1943 3 Sheets-Sheet 1
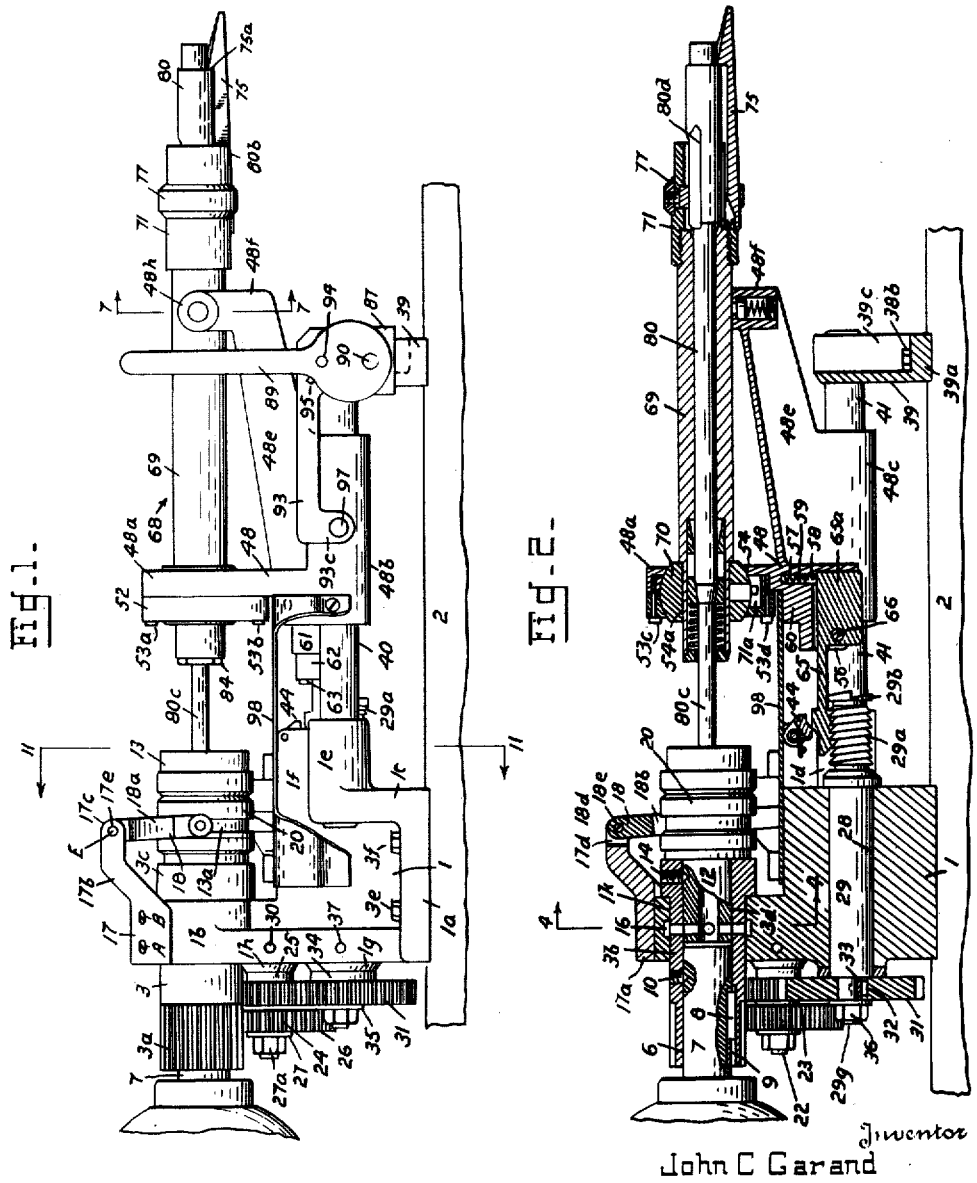
Inventor
John C Garand
By C.C.Herrstrom & H.E.Thibodeau
Attorneys

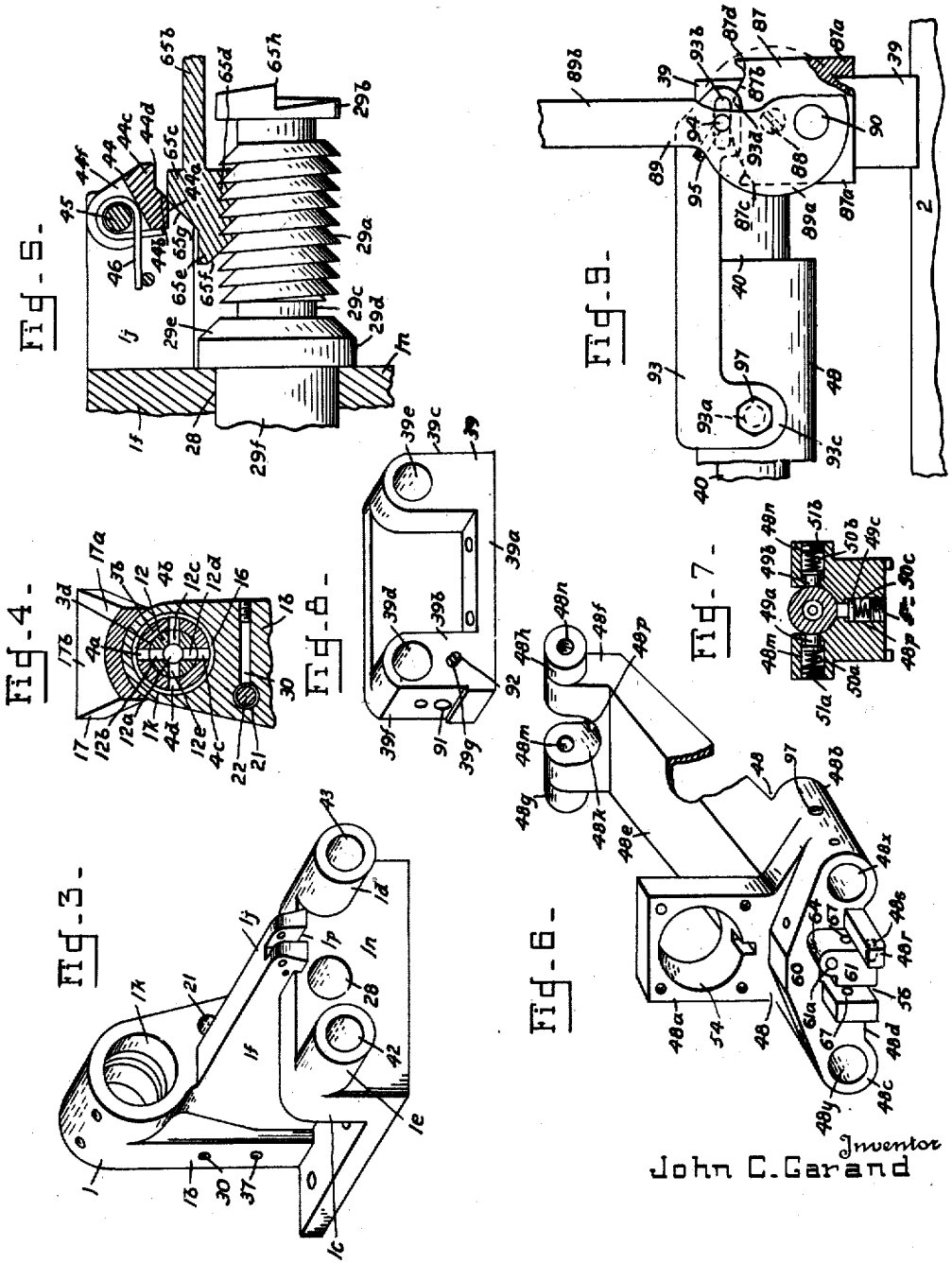

Feb. 8, 1944.    J. C. GARAND    2,340,874
MACHINE TOOL FEEDING MECHANISM
Filed March 20, 1943    3 Sheets-Sheet 3
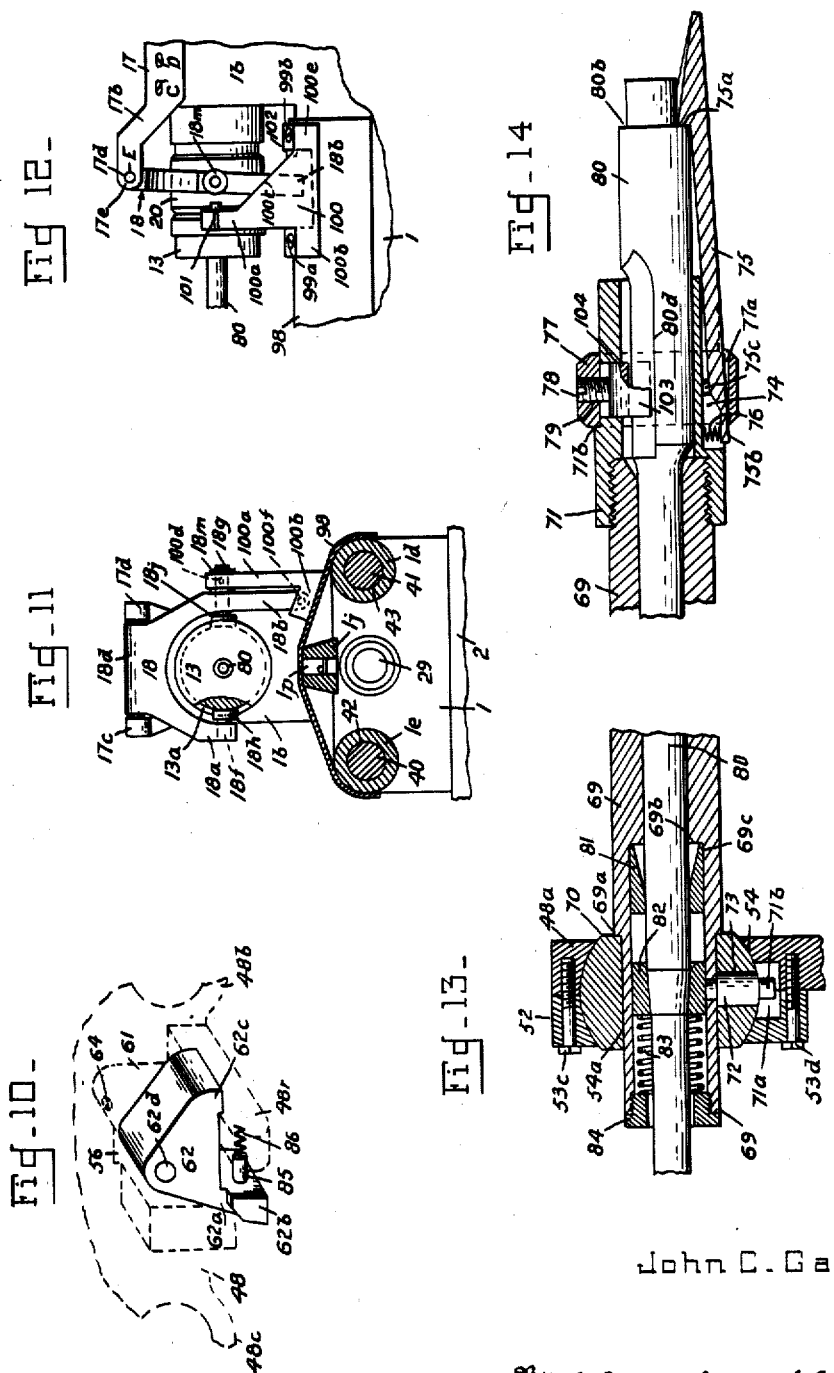
Inventor
John C. Garand
By C. C. Harrstrom & H. E. Thibodeau
Attorneys Patented Feb. 8, 1944

2,340,874

UNITED STATES PATENT OFFICE 2,340,874

MACHINE TOOL FEEDING MECHANISM

John C. Garand, Springfield, Mass.

Application March 20, 1943, Serial No. 479,827

11 Claims. (Cl. 10—105)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a feeding mechanism for a machine tool, particularly for a thread cutting machine tool.

The conventional manner of cutting threads upon a cylindrical member relies on self-feeding of the cylindrical member into the thread cutting dies, that is, the threads cut on such cylindrical member serve to advance the member into the dies. It is apparent that much difficulty would arise from such method when it is desired to cut a relatively fine thread upon the end of a cylindrical member of large mass. This problem is particularly acute in the cutting of a fine thread upon the end of a rifle barrel. The mass of the barrel is so large with respect to the size of the threads being cut that if no means are provided for advancing the barrel into the dies except the self-feeding action of such dies on the thread, it is found that the threads produced are badly torn and rough and entirely unsuitable for use.

Accordingly it is an object of this invention to provide a feeding mechanism for a thread cutting machine tool to support and advance a cylindrical member of large mass into a thread cutting die to form a fine thread on one end of the cylindrical member.

Another object of this invention is to provide a feeding mechanism for a thread cutting machine tool, to support a firearm barrel, and feed the barrel into a thread cutting die to cut a fine thread on one end of the cylindrical member.

Another object of this invention is to provide a feeding mechanism for a thread cutting machine tool, to support a firearm barrel, and feed the barrel into a thread cutting die to cut a fine thread on one end of such barrel without imposing feeding strain on such threads.

A particular object of this invention is to provide a feeding mechanism for a thread cutting machine tool for cutting a fine thread on the muzzle end of a firearm barrel such as disclosed in U. S. Patent No. 1,892,141 to John C. Garand.

Still another object of this invention is to provide for a machine tool a supporting apparatus to support a firearm barrel while making machine tool operations thereon.

Another object of this invention is to provide a thread cutting machine tool for the production of identical threads on successive components.

The specific nature of the invention as well as other objects and advantages thereof will clearly appear from a description of a preferred embodiment as shown in the accompanying drawings in which:

Fig. 1 is a side elevational view of the threading machine.

Fig. 2 is a longitudinal cross sectional view of Fig. 1.

Fig. 3 is a perspective view of the bearing block.

Fig. 4 is a partial cross sectional view taken along the plane 4—4 of Fig. 2.

Fig. 5 is an enlarged partial view showing the latch held in engagement with the lead screw by the pawl.

Fig. 6 is a perspective view of the slide.

Fig. 7 is a cross sectional view taken along the plane 7—7 of Fig. 1.

Fig. 8 is a perspective view of the bearing block.

Fig. 9 is an enlarged view showing in detail the connection between the lever and the link.

Fig. 10 is an enlarged perspective view showing the stop assembled to the end of the slide.

Fig. 11 is a cross sectional view taken along the plane 11—11 of Fig. 1.

Fig. 12 is a partial right side elevational view of the die head and yoke showing the trip block assembled to the slide.

Fig. 13 is an enlarged partial longitudinal sectional view showing the swiveling mounting of the barrel tube to the slide.

Fig. 14 is an enlarged longitudinal sectional view showing the method of latching the barrel.

Referring to the drawings wherein like numerals refer to similar parts, there is shown in Figs. 1 and 2 in assembled relation a preferred form of machine tool embodying this invention. A bearing block 1 is secured by four screws 3e, 3f, 3g and 3h, two of which, 3e and 3f, are shown, to one end of a suitable base 2. The bearing block 1 is an integrally cast member comprising a base 1a, an upwardly projecting bearing bracket 1b on one end of the base 1a and an upwardly projecting bracket 1c on the other end of base 1a. Two long integral bosses 1d and 1e are provided on the face of bracket 1c as viewed in Fig. 3. The bracket 1b projects somewhat above the bracket 1c. On the bracket 1b two small bosses 1g and 1h are provided as shown in Fig. 1. An integral vertical web member 1f is provided in the center of base 1a to support brackets 1b and 1c. An integral bifurcated end 1j of web 1f projects a short distance beyond the face of bracket 1c.

A suitably bored hole 1k in the upper portion of bracket 1b is provided to receive a spindle 3. The spindle 3 is a tubular member comprising at one end a long gear-toothed portion 3a, a central bearing portion 3b, which fits snugly but movably within the hole 1k of bracket 1b, and a hub 3c which is of somewhat larger diameter than the bearing portion 3b. The hub 3c bears against the face of bracket 1b. In the bearing portion 3b of spindle 3, and centrally disposed thereon radial oil holes 4a, 4b, 4c and 4d (Fig. 4) are provided which connect with an axial hole 3d in the spindle 3. An axial hole 6 is provided in the gear-toothed portion 3a of the spindle 3.

A shaft 7 of a motor (not shown) is inserted in the hole 6 of the spindle 3. The spindle 3 is held in locked relation with the shaft 7 by a key 8 which engages a suitable slot 9 in the walls of the hole 6. A set screw 10 which passes through a suitable hole in the spindle 3 enters a slight recess in the shaft 7.

A shaft 12 of a conventional thread cutting die head 13 is inserted within the axial hole 3d of the spindle 3. A set screw 14, provided in a threaded hole in spindle 3, engages a recess in the shaft 12, thereby locking the die head 13 to the spindle 3. An axial oil hole 12a (Fig. 4) is provided in the shaft 12 of die head 13 and four radial oil holes 12b, 12c, 12d and 12e in the shaft 12 are aligned with corresponding oil holes 4a, 4b, 4c and 4d in the spindle 3. An internal annular oil grove 16 (Fig. 4) is provided on the interior surface of the hole 1k of the bracket 1b adjacent the radial holes 4a, 4b, 4c and 4d.

A bracket 17 (Figs. 1, 2, 11, 12) is secured to the top of bracket 1b by the screws A, B, C, and D. The bracket 17 is an integral member comprising a base 17a shaped to fit the top of bracket 1b and an arm 17b projecting upwardly and to the right as shown in Figs. 1 and 2 at an angle from the base 17a. The end of arm 17b is bifurcated to form two oppositely disposed lugs 17c and 17d. A transverse hole 17e is provided in the lugs 17c and 17d to pivotally mount a yoke 18 (Figs. 1, 2, 11, 12). The yoke 18 is a U-shaped member with two downwardly projecting arms 18a and 18b, arm 18b being somewhat longer than arm 18a. The top 18d of yoke 18 is suitably shaped to fit between lugs 17c and 17d of bracket 17 and yoke 18 is pivotally mounted on bracket 17 by a transverse pin E which passes through hole 17e in lugs 17c and 17d and hole 18e in yoke 18. Inwardly projecting shoes 18h and 18j are suitably secured to arms 18a and 18b of yoke 18 by studs 18f and 18g and engage an annular groove 13a in die head 13, for the purpose of connecting yoke 18 to die head 13 for actuation of the die chasers (not shown) within the die head in conventional fashion. The stud 18g extends outwardly somewhat beyond arm 18b of yoke 18. A roller 18m is rotatably mounted on the extended portion of stud 18g and is suitably secured thereto.

In a threaded hole 21 (Figs. 3, 4), which passes through the boss 1h and the bracket 1b, a stud 22 is secured. A conventional compound or double bushing 23 (Figs. 1, 2) provided with an integral external key is placed over the stud 22 and a gear 24 is secured on the bushing 23, the key on bushing 23 engaging a suitable key slot in the gear. A washer 25 is provided on stud 22 adjacent the boss 1h. Lubrication of the stud 22 and bushing 23 is provided for by a transverse oil passage 30 passing through the bracket 1b. Provision is made at the end of the passage 30 to receive a conventional grease cup fitting. A gear 26 which engages the gear-toothed portion 3a of spindle 3 is also mounted on the outer end of compound bushing 23 and secured by the external key. The bushing 23 is revolvably secured to the stud 22 by a washer 27 and a nut 27a.

A suitable hole 28 (Figs. 2, 3) is bored longitudinally through bracket 1b and the axis of the web 1f to receive a long feed screw 29. The right end of feed screw 29 as viewed in Fig. 2 is provided with a threaded portion 29a, the teeth of which are of saw-tooth form. The extreme right end of feed screw 29 (Fig. 2) is shaped to form a spiral cam 29b (Fig. 5). At the termination of threaded portion 29a a narrow annular groove 29c (Fig. 5) is provided. Adjacent this groove there is provided about a shaft portion 29f an integral collar 29d with a sharply tapered conical shoulder 29e extending to the bottom corner of groove 29c. The shaft 29f is rotatably supported by hole 28 of web 1f, collar 29d being adjacent face 1n of bracket 1c. The end 29g of shaft 29f projects through bracket 1b and boss 1g. A washer 34 is placed over the projecting end 29g adjacent boss 1g and a gear 31 is held in locked relation on the end of shaft 29f by a key 32 and a key slot 33 in the shaft 29f. The gear 31 intermeshes with gear 24. A nut 36 and washer 35 are fastened to end 29g of the lead screw 29. A hole 37 is provided in the bearing member 1b with a suitable grease retaining cup to lubricate shaft 29f as it rotates within hole 28.

Secured to the other end of base 2 by screw 38b is a rod support 39. The rod support 39 (Figs. 1, 2, 8, 9) is an integrally cast U-shaped member comprising a base 39a and two upwardly projecting brackets 39b and 39c at each end of base 39a. On a suitable milled face 39f on the outside surface of bracket 39b of rod support 39, a stop plate 87 is secured approximately in the center of bracket 39b by a screw 88. The stop plate 87 (Fig. 9) is a small somewhat rectangular plate provided with two vertical ribs 87a on its vertical edges. When the plate 87 is placed adjacent the surface 39f of the rod support 39, the ribs 87a snugly fit on each side of the bracket 39b thereby preventing sideways movement of the plate. The upper surface 87b of the plate 87 is of arcuate shape and the ends of this surface terminate in small circular notches 87c and 87d respectively.

A lever 89 (Fig. 9) is pivotally secured to the rod support 39 abutting the plate 87 by a pin 90 which passes through a suitable hole 91 through the rod support 39, plate 87 and the lever 89. The pin 90 is secured to the rod support 39 by a set screw 92 (Fig. 8) provided in a suitably threaded hole 39g in the rod support 39. The lever 89 comprises a flat cylindrical end 89a and an upwardly projecting handle portion 89b. A link 93 (Figs. 1, 9) connects the lever 89 with a slide 48, which will be described. Integral downwardly projecting lugs 93c and 93d are provided on each end of link 93. A circular hole 93a is provided in lug 93c for attaching link 93 to slide 48 by a bolt 97. A slotted hole 93b is provided in lug 93d to attach the link 93 to the lever 89 by a pin 94. The pin 94 is in turn secured to the central portion of lever 89 by a set screw 95 which is screwed into a suitably threaded hole.

Suitable holes 39d and 39e (Fig. 8) in brackets 39b and 39c, respectively, in the rod support 39, are provided to receive slide rods 40 and 41 (Figs. 1, 2, 11) respectively. The slide rods 40 and 41 are cylindrical and extend longitudinally along the base 2 passing through suitably bored holes 42 and 43 in the bosses 1e and 1d respectively.

In a slot 1p (Fig. 3) formed by the bifurcated end 1j of the member 1f a pawl 44 (Figs. 2, 5) is inserted and is held therein by a transverse pin 45 which passes through suitable holes in the end 1j of member 1f and in the pawl 44. The pawl 44 has a downwardly projecting lug 44a. The right side of lug 44a as viewed in Fig. 5 is inclined upwardly to form a sloped surface 44b which engages a corresponding surface of a latch 65 which will be described. A projecting lug 44c is formed at right angles to the lug 44a on pawl 44 and has a rounded bottom corner 44d. A slot 44f is centrally provided in the pawl 44 to house a torsion spring 46, which is looped about the pin 45 to bias the pawl 44 counterclockwise as viewed in Figs. 5 and 2. The pawl 44 cannot be rotated in a clockwise direction beyond that shown in Figs. 2 and 5 because the pawl 44 strikes the bottom of slot 1p thereby preventing further rotation.

An integrally cast slide 48 (Figs. 1, 2, 6) is provided having a rectangularly-shaped body 48a, two downwardly projecting cylindrical bearing arms 48b and 48c on each side of the body 48a, and a stiffening web 48d between the arms 48b and 48c. Longitudinal holes 48x and 48y bored in the arms 48b and 48c are provided for mounting the slide 48 on the slide bars 40 and 41. Projecting to the right as shown in Fig. 1 and sloping upwardly from the body 48a is an inverted channel-shaped support 48e. The end of support 48e terminates in an integral upstanding bracket 48f. On each side of the bracket 48f cylindrical projecting bosses 48g and 48h are provided and are separated by a U-shaped recess 48k in the bracket 48f. Horizontal holes 48m and 48n are provided respectively in the bosses 48g and 48h. A similar hole 48p is provided in the bracket 48f directly under the recess 48k (Fig. 7). Each of the holes 48m, 48n and 48p is suitably counterbored to receive plungers 49a, 49b and 49c. Springs 50a, 50b and 50c are provided directly in back of the plungers 49a, 49b and 49c respectively to bias the plungers outwardly into the recess 48k. The springs 50a, 50b and 50c are retained within the recesses by screws 51a, 51b and 51c respectively which are threadably secured within counterbored holes 48m, 48n and 48p. A bearing cap 52 (Figs. 1 and 2) is secured to the left side of the body 48a as viewed in Figs. 1 and 13 by screws 53a, 53b, 53c and 53d. The bearing cap 52 and the body 48a are suitably bored to form a socket joint 54 to receive a bearing member 70 which will be described.

A longitudinal slot 56 (Figs. 2 and 6) is centrally provided on the underside of the slide 48. A hole 57 (Fig. 2) is provided extending upwardly from the bottom of the slot 56 in member 48a to receive a plunger 58 and a plunger spring 59. Adjacent the body 48a there is provided an integral raised surface 60 which underlies the bottom of bearing cap 52.

An integral projecting shoulder 61 of slide 48 is provided to support a stop 62 (Fig. 10). The stop 62 has a downwardly projecting arm 62a, the end of which is shaped to form a cam surface 62b. The other side of the stop 62 projects downwardly and outwardly to form an arm 62c.

A longitudinal hole 61a (Fig. 6) is provided near the upper top edge of the shoulder 61 of the slide 48 to receive a headed pin 63 (Fig. 1). The stop 62 is pivotally mounted on the pin 63 by its engagement in the hole 62d. The pin 63 is secured to the projection 61 by a set screw 64 provided in a suitably threaded hole (Fig. 10) in the top of the projection 61 and extending downwardly to the pin 63. In a projecting end portion 48r of slide 48 there is provided a transverse hole 48s (Fig. 6). Inserted within this hole is a plunger 85. A plunger spring 86 bottoms in the hole 48s in back of the plunger 85 to bias the plunger spring 86 outwardly to thereby exert a force against the projecting end 62a of stop 62, tending to rotate the stop 62 in a clockwise direction as viewed in Fig. 10.

A latch 65 (Figs. 2 and 3) is pivotally mounted within the slot 56 on slide 48 by a transverse pin 66 which is inserted in a suitable hole 67 (Fig. 6) in the slide 48 and the latch 65. The latch 65 has a rectangular end portion 65a and an extending arm 65b (Figs. 2 and 5). An upstanding head 65c is formed on the end of the arm 65b and on the underside of arm 65b are provided saw-tooth teeth 65d adapted to engage the teeth 29a of feed screw 29. On the extreme end 65e of the arm 65b, adjacent the threaded portion, there is provided a bevel 65f corresponding to the tapered portion 29e of collar 29d. Extending at an inclined angle upwardly from the end 65e there is provided a cam surface 65g on the head 65c.

A barrel holder assembly 68 (Figs. 1, 2, 13, 14) comprising a tube 69, a bearing 70 and a sleeve 71 is supported by the bracket 48f and the body 48a of slide 48. The barrel bearing 70 is a doubly truncated sphere and is mounted within the socket joint 54 of the body 48a to permit swiveling movement of the barrel holder tube 69. A longitudinal hole 54a is provided in the bearing 70 to receive the tube 69. The tube 69 is secured to the bearing 70 by a pin 72 which projects upwardly from a suitable hole 73 provided in the bearing 70. A shoulder 69a on tube 69 abuts the bearing 70. The bearing cap 52 secures the bearing 70 within the socket joint 54. As it is desirable to limit the swiveling movement of the barrel holder tube 69 to movement in a vertical plane a key 71b is provided in a suitable recess 71a in the bottom of the bearing cap 52 and the body 48a to prevent any sideways motion.

The sleeve 71 (Fig. 14) is threadably secured to the tube 69. A longitudinal slot 74 is provided on the underside of sleeve 71 to receive a barrel latch 75. The barrel latch 75 is a long, narrow member having an upwardly projecting latch shoulder 75a formed near the right end of the latch 75 as viewed in Fig. 14. From the top of the shoulder 75a the latch is inclined downwardly to the end thereof to form a suitable surface for manually depressing the latch. The other end of latch 75 is cut out to form a step 75b. Slightly to the right of step 75b as shown in Fig. 14 there is provided an integral transverse segment member 75c which pivotally engages the walls of suitable transverse slot 71a in the bottom of sleeve 71. A spring 76 is placed between the bottom of slot 74 of sleeve 71 and the step 75b to bias the latch shoulder 75a upwardly. There is provided on the top of the sleeve 71 a transverse slot 104, which is cut through to the interior of the sleeve, to receive a stop 103. The stop 103 is in the form of a segment and is slidably inserted in the slot 104, clearance being provided on the underside of the segment to permit a barrel to be inserted in the sleeve 71. However the stop 103 projects sufficiently into the sleeve to engage shoulder 80d provided on each side of a barrel 80 as will be presently described. A collar 77, provided with a suitable longitudinal slot 77a to receive the latch 75, is placed about the sleeve 71 to retain the latch 75 within the slot 74 and the stop 103 within the slot 104. The collar 77 abuts against a shoulder 71b of sleeve 71 and is secured to the sleeve 71 by a set screw 78 provided in the top of collar 77 in a threaded hole 79. The sleeve 71 is bored to permit the insertion of a rifle barrel 80. The right end of tube 69 as viewed in Fig. 13 has a counterbored hole 69c to receive a guide bushing 81 and a floating barrel bushing 82. The guide bushing 81 has a conically shaped interior, the larger end of which faces to the right as viewed in Fig. 13 and abuts a shoulder 69b formed by the counterbored hole 69c in tube 69. The barrel bushing 82 is reamed to fit the tapered forward portion of barrel 80 and the interior corners of each each of the bushing suitably beveled to prevent the barrel from catching on the corners of the bushing as the barrel is inserted therein. A spring 83 is placed adjacent the left face of bushing 82 to bias it to the right as shown in Fig. 13. A hollow bolt 84 is threadably screwed into the right end of the tube 69 as viewed in Fig. 13 to retain the spring 83 within the tube 69.

A suitably shaper cover 98 (Figs. 1, 2, 11) is provided to cover the latch and lead screw mechanism. The cover 98 is secured to the slide 48 by suitable screws in the surface 60 of slide 48 and extends over the member 1f of bearing block 1. Secured to the cover 98, as shown in Figs. 11 and 12, by the screws 99a and 99b is a trip block 100. The trip block 100 is assembled opposite the arm 18b of yoke 18 and comprises an upwardly projecting arm 100a with an integral angularly displaced base 100b. The upwardly projecting arm 100a is supported by an integral stiffening web 100c extending from the top of the arm 100a to the base 100b. Near the top of the arm 100a a transverse threaded hole 100d is provided to receive an adjusting screw 101 (Fig. 12). The adjusting screw 101 contacts the roller 18m provided on stud 18g on the arm 18b of the yoke 18. In a projecting portion 100e on the end of base 100b there is provided another adjusting screw 102 which is screwed into a threaded hole 100f which cooperates with the lower portion of the arm 18b of yoke 18.

To operate the barrel threading machine herein described, the source of power (not shown) connected to the shaft 7 revolves the die head 13. Power is also transmitted to the lead screw 29 through the gears 23, 24 and 31, thereby revolving the feed screw 29. The barrel 80 is inserted in the barrel holder tube 69 by placing the muzzle of the barrel in the opening provided in the sleeve 71, depressing the latch 75 and pushing the barrel to the left as shown in Figs. 1 and 2. The muzzle of the barrel is guided through tube 69 by the tapered guide bushing 81 and into the floating barrel bushing 82. When the barrel is inserted into the barrel bushing 82 a tapered portion of the barrel engages the correspondingly tapered interior of the bushing and forces the bushing against the spring 83, thereby compressing the spring 83. When the barrel 80 has been pushed hard against the bias of spring 83 and then released, the spring 83 will then bias the barrel 80 in the opposite direction until shoulder 80b of barrel 80 engages shoulder 75a of latch 75. Barrel 80 is then ready to be threaded. The barrel is locked against rotational movement by the stop 103 which engages the flat surfaces 80d on barrel 80.

When the lever 89 is rotated to the left as viewed in Figs. 1 and 9 the pin 94 (Fig. 9) contacts the end of slotted hole 93b and link 93 and slide 48 are moved in a corresponding direction. As the slide 48 is thus moved the face 62b of stop 62 (Fig. 10) comes in contact with the cam face 29b of the feed screw 29 while concurrently the surface 65g of latch 65 contacts the rounded corner 44d of the pawl 44 camming the latch 65 downwardly. However, the teeth 65d cannot engage the corresponding teeth 29a of the feed screw 29 until the shoulder 65h on the cam 29b contacts the front edge of the projecting member 62a of the stop 62, therby throwing the stop out of engagement with the cam surface 29b. Thus when the stop 62 is forced out of engagement with the cam surface 29b, the continued pressure on lever 89 forces the slide 48 still further ahead and surface 44b of pawl 44 engages surface 65g of latch 65 and cams the latch downward so that the teeth 65d will always engage the teeth 29a of feed screw 29 in perfect intermeshing relation. At this point the pin 94 strikes the notch 87c limiting further movement of the lever 89 to prevent injury to the threads on either the latch or feed screw as the latch 65 has engaged feed screw 29. When the latch 65 engages feed screw 29, the slot 93b of the link 93 allows the slide 48 to be pulled along the slide bars 40 and 41, thereby feeding the end of the barrel 80 into the die head 13, and the muzzle end 80c of barrel 80 engages the die chasers within the die head 13. The threads are then cut in a conventional manner.

When the correct amount of thread has been cut on the end 80c of the barrel 80, the trip block on the cover 98 has reached a point where the roller 18m has contacted the adjusting nut 101 on the trip block 100 (Fig. 12). As the adjusting nut 101 contacts the roller 18m a collar 20 provided on die head 13 is biased to the right as viewed in Fig. 12 by a spring (not shown) within the die head 13, thus causing the dies (not shown) to open thereby terminating the thread cutting operation. The latch 65 (Fig. 5) has in the meantime passed under pawl 44 and the bottom surface of the pawl 44 has slipped off the surface 65c of the latch 65. Then the plunger 58, actuated by spring 59, biases the latch 65 clockwise as shown in Fig. 2 out of engagement with feed screw 29. Thus the slide 48 is stopped when latch 65 is disengaged from feed screw 29. As a precautionary measure, in the event of some failure of the mechanism to bring the latch out of engagement with the feed screw, the beveled shoulder 65f on the end of latch 65 will contact the corresponding beveled shoulder 29e of collar 29d on feed screw 29, thereby camming latch 65 out of engagement with feed screw 29 to stop the rearward movement of slide 48 and preventing any damage to the mechanism.

The slide 48 is manually returned to its starting position by the lever 89. As the slide 48 is returned to this position, the latch 65 contacts the pawl 44 and biases the pawl 44 in a counterclockwise direction as shown in Fig. 2 permitting the slide 48 to be so withdrawn. The torsion spring 46 returns the pawl 44 to its normal position. As the slide 48 is returned to the starting position, the lower adjusting screw 102 on the trip block 100 contacts the lower edge of the arm 18c of yoke 18 which brings the collar 20 to its original position and, assisted by the spring (not shown) in the die head 13, automatically closes the die chasers (not shown) within the die head 13 to be ready for cutting the thread of the next barrel inserted in the die head 13. The barrel 80 is then readily removed from the barrel holder tube by depressing the latch 75 and manually withdrawing the barrel.

Thus it is readily apparent that by the use of this machine tool feeding mechanism a fine thread can be cut quickly and conveniently on one end of a firearm barrel of considerable mass without danger of damage to either the die or the threads. It will also be noted that since the rotation of the feed screw 29 is synchronized with that of the thread cutting dies it is possible to reproduce identical threads on a plurality of workpieces such as the barrel 80, i. e., the threads cut will originate and end at identical angular locations with respect to the axes of the barrels.

It should be understood that while the machine tool feeding mechanism herein described is preferably used for cutting a thread on the muzzle of a firearm barrel this type of mechanism can be employed for cutting threads on any cylindrical object which is of such comparatively great mass in relation to the size of the threads that the threads as formed cannot be used to advance the work into the thread cutting dies.

I claim:

1. In a thread cutting machine, a rotating thread cutting die, a work support mounted for linear feeding movement with respect to said die, a rotating feeding screw having an exposed end disposed in the path of said work support, a connector secured to said work supporting member, a toothed portion on said connector adjacent said feed screw, means for engaging said toothed portion of the connector in the teeth of said lead screw and cam means on the exposed end of said feeding screw cooperating with said work support for preventing such engagement until said toothed portion is aligned with respect to the threads of said feed screw.

2. In a thread cutting machine, a rotating thread cutting die, a work support mounted for linear feeding movement with respect to said die, a rotating feeding screw, a connector pivotally secured to said work support, a toothed portion on said connector shaped to engage the threads of said fixed screw, resilient means biasing said connector away from such engagement position, means for moving said work support in a feeding direction whereby said toothed portion of the connector is moved adjacent to said feed screw, cam means in the path of such movement of the connector operable to engage said toothed portion in the threads of said feed screw and means preventing such movement of the work support until said toothed portion is aligned with the threads of said feed screw.

3. In a thread cutting machine, a rotating thread cutting die, a work support mounted for linear feeding movement with respect to said die, a rotating feeding screw, a connector pivotally secured to said work support, a toothed portion on said connector shaped to engage the threads of said feed screw, resilient means biasing said connector away from such engagement position, means for moving said work support in a feeding direction whereby said toothed portion of the connector is moved adjacent to said feed screw, cam means in the path of such movement of the connector operable to engage said toothed portion in the threads of said feed screw, means preventing such movement of the work support until said toothed portion is aligned with the threads of said feed screw, means operable by movement of said work support to open said die at completion of a desired length of thread cutting and means for disengaging said connector from the feed screw after said die is opened.

4. In a thread cutting machine, a rotating thread cutting die, a work support mounted for linear feeding movement with respect to said die, a rotating feeding screw, a connector pivotally secured to said work support, a toothed portion on said connector shaped to engage the threads of said feed screw, resilient means biasing said connector away from such engagement position, means for moving said work support in a feeding direction whereby said toothed portion of the connector is moved adjacent to said feed screw, a first cam means in the path of such movement of the connector operable to engage said toothed portion in the threads of said feed screw, a second cam means on the end of said feed screw engaging a stop on said work support preventing feeding movement of the work support, said cam means disengaging said stop when said toothed portion is aligned with the threads of the feed screw.

5. In a thread cutting machine, a rotating thread cutting die, a work support mounted for linear feeding movement with respect to said die, a rotating feeding screw, a connector pivotally secured to said work support, a toothed portion on said connector shaped to engage the threads of said feed screw, resilient means biasing said connector away from such engagement position, means for moving said work support in a feeding direction whereby said toothed portion of the connector is moved adjacent to said feed screw, a first cam means in the path of such movement of the connector operable to engage said toothed portion in the threads of said feed screw, a second cam means on the end of said feed screw engaging a stop on said work support preventing feeding movement of the work support, said second cam means disengaging said stop when said toothed portion is aligned with the threads of the feed screw, means operable by movement of said work support to open said die at completion of desired length of thread cutting and a third cam means on said feed screw engaging said connector after said die is opened to remove the connector from engagement with the feed screw.

6. In a thread cutting machine, a rotating thread cutting die, a work support mounted for linear feeding movement with respect to said die, a rotating feeding screw, a connector member mounted on said work supporting member, means engaging said connector member with said feed screw to effect feeding movement of the work supporting member, means operable by movement of said work support to open said die at completion of desired length of thread cutting and means for disengaging said connector from the feed screw after said die is opened.

7. A machine for successively cutting identical threads on a plurality of similar workpieces comprising a rotating thread cutting die, a work support mounted for linear feeding movement with respect to said die, means on said work support arranged to engage a common reference surface on each of the workpieces to successively hold such pieces in the same angular relation to said die, a rotating feed screw, gearing connections between said feed screw and said rotating die, a connector member mounted on said work supporting member, means effecting engagement of said connector with the feed screw whereby a feeding movement is imparted to said work support, said means arranged to engage said connector to said feed screw at a fixed relative position of said connector with respect to said feed screw, means operable by movement of said work support to open said die at completion of desired length of thread cutting and means for disengaging said connector from the feed screw after said die is opened.

8. A machine for successively cutting identical threads on a plurality of similar workpieces comprising a rotating thread cutting die, a work support mounted for linear feeding movement with respect to said die, means on said work support arranged to engage a common reference surface on each of the workpieces to successively hold such pieces in the same angular relation to said die, a rotating feed screw, gearing connections between said feed screw and said rotating die, a connector member mounted on said work supporting member, a toothed portion on said connector adjacent said feed screw, means for engaging said toothed portion of the connector in the teeth of said lead screw, means preventing such engagement until said toothed portion assumes a fixed relative position with respect to said feed screw, means operable by movement of said work support to open said die at completion of desired length of thread cutting and means for disengaging said connector from the feed screw after said die is opened.

9. A machine for successively cutting identical threads on a plurality of similar workpieces comprising a rotating thread cutting die, a work support mounted for linear feeding movement with respect to said die, means on said work support arranged to engage a common reference surface on each of the workpieces to successively hold such pieces in the same angular relation to said die, a rotating feed screw, gearing connections between said feed screw and said rotating die, a connector pivotally secured to said work support, a toothed portion on said connector shaped to engage the threads of said feed screw, resilient means biasing said connector away from such engagement position, means for moving said work support in a feeding direction whereby said toothed portion of the connector is moved adjacent to said feed screw, cam means in the path of such movement of the connector operable to engage said toothed portion in the threads of said feed screw, means preventing such movement of the work support until said toothed portion attains a fixed relative position with respect to said feed screw, means operable by movement of said work support to open said die at completion of desired length of thread cutting and means for disengaging said connector from the feed screw after said die is opened.

10. A machine for successively cutting identical threads on a plurality of similar workpieces comprising a rotating thread cutting die, a work support mounted for linear feeding movement with respect to said die, means on said work support arranged to engage a common reference surface on each of the workpieces to successively hold such pieces in the same angular relation to said die, a rotating feed screw, gearing connections between said feed screw and said rotating die, a connector pivotally secured to said work support, a toothed portion on said connector shaped to engage the threads of said feed screw, resilient means biasing said connector away from such engagement position, means for moving said work support in a feeding direction whereby said toothed portion of the connector is moved adjacent to said feed screw, a first cam means in the path of such movement of the connector operable to engage said toothed portion in the threads of said feed screw, a second cam means on the end of said feed screw engaging a stop on said work support preventing feeding movement of the work support, said second cam means disengaging said stop when said toothed portion attains a fixed relative position with respect to said feed screw, means operable by movement of said work support to open said die at completion of desired length of thread cutting and means for disengaging said connector from the feed screw after said die is opened.

11. A machine tool support for a firearm barrel comprising a carriage arranged to be mounted on the bed of a machine tool, a tubular member supported on said carriage by a floating bearing, said tubular member being shaped to permit a portion of a firearm barrel to be inserted therein, a latch on said tubular member arranged to engage one end of an inserted barrel, a spring biased collar within said tubular member arranged to hold an inserted barrel against said latch and a stop in said tubular member arranged to engage a reference surface on an inserted barrel to hold the barrel in fixed angular relation with respect to said tubular member.

JOHN C. GARAND.